United States Patent [19]

Macon, Jr. et al.

[11] Patent Number: 5,752,249

[45] Date of Patent: May 12, 1998

[54] SYSTEM AND METHOD FOR INSTANTIATING A SHARABLE, PRESISTENT PARAMETERIZED COLLECTION CLASS AND REAL TIME PROCESS CONTROL SYSTEM EMBODYING THE SAME

[76] Inventors: Charles E. Macon, Jr., 24413 N. 40th Dr., Glendale, Ariz. 85310; William H. Morphew, 17714 N. 64th Dr., Glendale, Ariz. 85308

[21] Appl. No.: 749,315

[22] Filed: Nov. 14, 1996

[51] Int. Cl.⁶ .................................................. G06F 17/30
[52] U.S. Cl. ................................. 707/103; 707/104
[58] Field of Search ............................ 395/614, 136, 395/137, 138; 364/468.01; 707/103, 1; 1/1

[56] References Cited

U.S. PATENT DOCUMENTS

| | | | |
|---|---|---|---|
| 4,403,288 | 9/1983 | Christian et al. | 395/825 |
| 4,604,694 | 8/1986 | Hough | 395/726 |
| 5,034,914 | 7/1991 | Osterlund | 395/872 |
| 5,184,325 | 2/1993 | Lipovski | 365/189.07 |
| 5,247,646 | 9/1993 | Osterlund | 395/888 |
| 5,291,593 | 3/1994 | Abraham et al. | 395/614 |
| 5,295,256 | 3/1994 | Bapat | 395/500 |
| 5,428,782 | 6/1995 | White | 395/671 |
| 5,436,909 | 7/1995 | Dev | 395/182.02 |
| 5,519,860 | 5/1996 | Liu et al. | 395/607 |
| 5,555,388 | 9/1996 | Shaughnessy | 395/427 |
| 5,581,755 | 12/1996 | Koerber | 395/614 |

*Primary Examiner*—Thomas G. Black
*Assistant Examiner*—Diane Mizrahi
*Attorney, Agent, or Firm*—William C. Munck; David H. Hitt

[57] ABSTRACT

The present invention provides a computer system, a method of creating and allowing access to a parameterized collection class and a real time process control system. The computer system includes: (1) a memory containing an operating system capable of operating on one or more parameterized collection classes, or objects, (2) a persistent data store, associated with the memory, in which a parameterized collection class is memory-mapped and (3) a processor, associated with the memory and the persistent data store, that: (a) instantiates an occurrence of the parameterized collection class in the memory, the parameterized collection class thereby becoming persistent, and (b) provides direct access by at least one routine executing in the processor to the persistent parameterized collection class, the persistent parameterized collection class surviving termination of the routine.

38 Claims, 10 Drawing Sheets

Microfiche Appendix Included
(3 Microfiche, 163 Pages)

SYSTEM AND METHOD FOR INSTANTIATING A SHARABLE, PRESISTENT PARAMETERIZED COLLECTION CLASS AND REAL TIME PROCESS CONTROL SYSTEM EMBODYING THE SAME

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

REFERENCE TO A MICROFICHE APPENDIX

A microfiche appendix containing computer program listings was submitted with this patent application and is hereby incorporated herein by reference. The microfiche appendix consists of three (3) microfiches with a total of 163 frames.

TECHNICAL FIELD OF THE INVENTION

The present invention is directed, in general, to computing systems and, more specifically, to a system and method for instantiating a sharable, persistent parameterized collection class and real time process control system embodying the same.

BACKGROUND OF THE INVENTION

A database is commonly referred to, or defined, as a collection of data—the datum may be related, unrelated, dependent or independent—that is organized usefully and is fundamental to a system, such as an inventory system. A database manager, which is a computer program, performs a range of tasks on databases, the range varying based on the intended use of the database and the sophistication of the database manager.

Typically, different database managers are distinguished on the basis of how they process and manipulate the data they are charged with. For example, some database managers only manipulate one data table at a time—a "flat-file" database manager, others process multiple data tables at one time, associating data from several different data tables—a "relational" database manager. Fundamental operations performed by database managers include storing data, creating indexes that allow fast retrieval of data, and, in the case of relational database managers, linking data from different tables.

A fundamental problem with database managers is their cost, this is often quantified in terms of processing overhead. For example, programs not only must share processing resources with the database manager, but they must also interact with the database manager to access the database, often waiting in line for other programs to complete their transaction. Conventional database managers tend to have very complicated schemes and restrictive structures that constrain the expressiveness of state-of-the-art application and system tools, such as object-oriented modeling, programming and design ("object-oriented tools").

Object-oriented tools provide ways of thinking about problems using models organized around real-world concepts. The fundamental construct of such tools is the object, which combines both data structure and behavior into a single entity. Object-oriented tools are quite useful for understanding problems, communicating with application experts, modeling enterprises, preparing documentation, and designing programs and databases.

Current object-oriented database managers unite two technologies: database management and object oriented tools. As mentioned above, object-oriented tools are expressive but lack data persistence (data that outlasts the execution of a program). Database managers have data persistence but lack expressibility. Object-oriented database managers attempt to combine data persistence and expressibility. This presents a twofold problem. First, conventional object-oriented tools and database managers represent fundamentally different paradigms. Second, their respective implementation tools mismatch when forced together to form different parts of a single system.

Currently there exists parameterized collection classes that provide a generalized mechanism for organizing objects into collections and providing expressive and natural access to those objects. These collection classes however are not easily saved or made persistent.

Therefore, what is needed in the art is a transparent and non-intrusive way of making parameterized collection classes persistent, allowing one or more parameterized collection classes to provide the functionality of a database in combination with the expressiveness of object-oriented collection classes, such that collections of objects survive, or persist, after the termination or loss of the program that instantiated or is accessing it.

SUMMARY OF THE INVENTION

To address the above-discussed deficiencies of the prior art, it is a primary object of the present invention to provide a way of allowing one or more instantiated parameterized collection classes to survive the termination or loss of a routine that instantiated them.

In the attainment of the above primary object, the present invention provides a computer system, a method of creating and allowing access to a persistent parameterized collection class and a real time process control system. The computer system includes: (1) a memory containing an operating system capable of operating on one or more parameterized collection classes, or objects, (2) a persistent data store, associated with the memory, in which a parameterized collection class is memory-mapped and (3) a processor, associated with the memory and the persistent data store, that: (a) instantiates an occurrence of the parameterized collection class in the memory, the parameterized collection class thereby becoming persistent, and (b) provides direct access by at least one routine executing in the processor to the persistent parameterized collection class, the persistent parameterized collection class surviving termination of the routine.

The present invention introduces the unique cooperation of two heretofore disjoint concepts: memory-mapping of files and parameterized collection classes. These two concepts are joined to permit, via memory-mapping, parameterized collection classes (an object that can be associated with a routine) to be instantiated once and thereafter remain, even after the routine that instantiated them has been lost or terminated and even, in an advantageous embodiment, after the computer system itself has ceased to operate.

The persistent parameterized collection classes of the present invention may be suitably employed to define an object repository, or database, to thereby avoid meta-data associated with conventional databases and their attendant administration and configuration burdens. Persistence not only relieves the computer system from having to reinstantiate the persistent parameterized collection class, but this also prevents data contained within the persistent class from being corrupted or lost.

"Object repository" and "routine," for purposes of the present invention, are broadly defined for purposes of the present invention respectively as any collection of data, routines or objects, including traditional databases, and as any executable code, including code that expressly directs the steps that a computer is to take (as in procedural languages), sets forth rules that the computer is to follow (as in declarative languages) or defines objects and their relationships (as in object-oriented programming).

"Computer system," for purposes of the present invention, is also broadly defined to include all classes of computer, from microcomputer to mainframe, as well as cooperative combinations of processors or computers—networks. "Operating system," as used herein, includes all operating systems that can manipulate objects 15 in the manner set forth, whether associated with a single computer or distributed over multiple computers in a network. The present invention, in one embodiment, employs a WINDOWS® NT environment executing in a microprocessor-based computer to practice the present invention.

In a preferred embodiment of the present invention, the operating system supports execution of separate execution threads in the processor (or processors), the processor instantiating an occurrence of the persistent parameterized collection class in each of the separate execution threads, by mapping a shared single instance of a collection into address space of the instantiated thread, thereby providing direct access by routines executing within each of the separate execution threads to the persistent parameterized collection class. The present invention therefore can operate in a multithreaded, multitasking environment. However, the broad scope of the present invention is not limited to such environments.

In a preferred embodiment of the present invention, the persistent data store is a nonvolatile storage unit of a computer system. "Persistent," for purposes of the present invention, is defined as able to survive the loss or termination of the routine with which the persistent parameterized collection class is associated. "Persistent data store" includes, but is not limited to, a nonvolatile data store. Therefore, the persistent data store may exist in a computer system's main memory and therefore subject to loss upon interruption of power to the computer system. However, in an embodiment to be illustrated and described, the persistent data store is nonvolatile, allowing the persistent parameterized collection class to survive a loss of the thread of execution, the operating system, or even a loss of power. Accordingly, in one preferred embodiment of the present invention, the persistent parameterized collection class survives termination of the thread of execution, the operating system or power to the computer system.

In a preferred embodiment of the present invention, the persistent parameterized collection class is an object repository. However, those skilled in the art will understand that the broad principles of the present invention apply equally advantageously to objects and object repositories of any type.

In a preferred embodiment of the present invention, the at least one routine queries the persistent parameterized collection class to extract data therefrom. The at least one routine can therefore communicate (e.g., reference, operate, store, delete, etc.) data with the persistent parameterized collection class. This communication can be bidirectional, which is particularly advantageous in a real time process control system.

In a preferred embodiment of the present invention, the parameterized collection class includes access semantics selected from the group consisting of: (1) associative array access semantics and (2) iterator access semantics. Those skilled in the art will understand that procedural access semantics are advantageously employed to communicate with the persistent parameterized collection class. However, the broad scope of the present invention contemplates other modes of communication within other parameterized collection class.

In a preferred embodiment of the present invention, the persistent parameterized collection class is divided into a plurality of pages and transferred from the persistent data store as a function of a demand for the plurality of pages. In an embodiment to be illustrated and described, demand paging is employed to allow a single object to be accessed efficiently and safely. However advantageous demand paging may be, the broad scope of the present invention is not so limited.

In a preferred embodiment of the present invention, the persistent parameterized collection class and the at least one routine are executed in a single processor. Therefore, the present invention need not exist or be performed on a network. In fact, in an embodiment to be illustrated and described, the present invention employs but a single computer system.

In a preferred embodiment of the present invention, the parameterized collection class defines a plurality of persistent parameterized collection classes. The plurality of persistent parameterized collection classes may interact with one or more routines. This achieves both flexibility and scalability.

In a preferred embodiment of the present invention, the system is coupled to a real time process control system, the persistent parameterized collection class being an object repository containing data relating to a controlled plant. In the embodiment to be illustrated and described, the real time process control system has sensors and controllable devices. The sensors produce data for the computer system to receive. The controllable devices receive commands from the computer system to control the operation of the plant, most advantageously issued as a function of the data received from the sensors.

The present invention may operate to allow a persistent parameterized collection class to be the intermediary between the routines that control the plant and the data bus that transfers data to and from the computer system and the sensors and controllable devices. The result is a survivable, robust, persistent parameterized collection class whose existence is independent of the control routines with which it may interact. In fact, the persistent parameterized collection class is most preferably suited to survive loss of the operating system (such as happens in a system crash) or complete loss of the computer system itself (such as happens when electrical power is interrupted).

In a preferred embodiment of the present invention, during execution, the at least one routine detects whether the persistent parameterized collection class exists, and instantiates an parameterized collection class only if the persistent parameterized collection class does not exist.

In the present invention, creation of an parameterized collection class depends upon the existence of the persistent parameterized collection class: if the persistent parameterized collection class exists, the routine simply associates itself with it (or an instantiated instance of it). If not, the routine instantiates the parameterized collection class, associating itself with the newly-instantiated parameterized collection class during the process of instantiation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
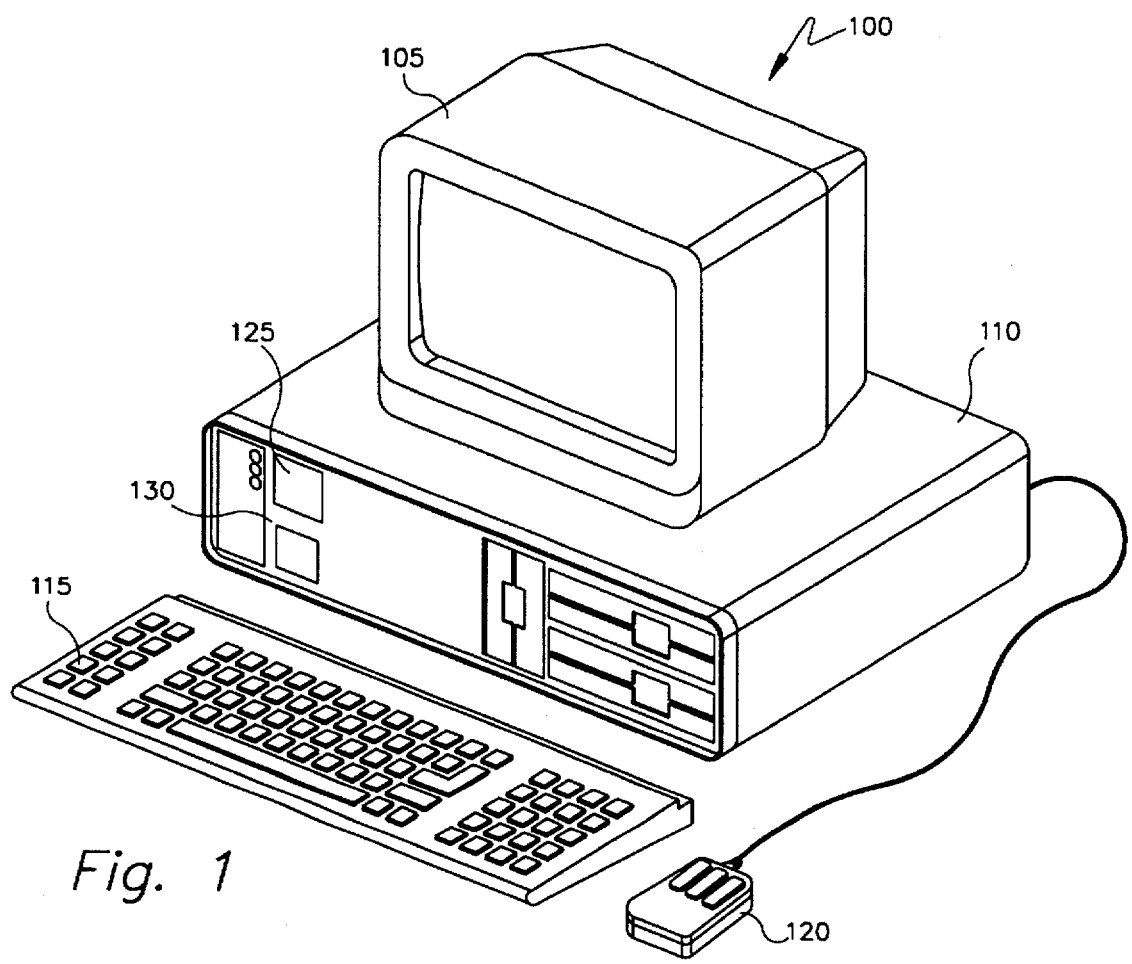
FIG. 1 illustrates an isometric view of a conventional computer that provides an exemplary environment within which persistent parameterized collection classes according to the present invention may be suitably implemented and operated.

Referring initially to FIG. 1, illustrates an isometric view of a conventional computer (generally designated 100), such as a personal computer ("PC") for example, that provides an exemplary environment within which persistent parameterized collection classes according to the present invention may be suitably implemented and operated. Since the present invention is not limited to application in a personal computing environment, FIG. 1 is illustrative only.

Exemplary PC 100 includes a display device or monitor 105, a main chassis 110, within which are various electronic components (discussed with reference to FIG. 3), and a plurality of exemplary conventional user interfaces, including a keyboard 115 and a mouse 120.

Display device 105, keyboard 115 and mouse 120 cooperate to allow communication between PC 100 and a user (not shown). Main chassis 110 illustratively includes a dedicated hardware reset switch 125 (adapted to trigger hardware reset circuitry (not shown) within main chassis 110 to reboot or restart PC 100 when the user depresses reset switch 125) and a power switch 130 (capable of interrupting and restoring power to PC 100). Interruption and restoration of power brings about a restart of PC 100. As will be discussed in greater detail hereinbelow, the computer processing environment of the illustrated embodiment uses the concepts of memory mapping of files and parameterized collection classes cooperatively to allow persistence of objects instantiated once by a routine and remaining after the routine is terminated, such as when a termination of power or a reboot occurs. Memory map is known.

Display device 105 may provide an area 130 for display of graphical data under the control of an exemplary graphical user interface ("GUI") operating system (not shown) executing within PC 100. The exemplary GUI operating system manages division of computer resources among various application tasks executing on PC 100. The GUI operating system is operative to divide area 130 of display device 105 into a plurality of suitably arranged windows that display data corresponding to each of the application tasks. Each window may suitably be allowed to occupy a portion or an entirety of area 130 presented on display device 105, depending on the user's wishes. Various ones of the windows may suitably occlude one another, whether in whole or in part.

As an overview of the illustrated embodiment, the GUI operating system is capable of operating on one or more parameterized collection classes, or objects, according to the principles of the present invention. PC 100 includes at least processing circuitry and each of a volatile (e.g., random access memory) and a non-volatile (e.g., a hard disk drive) memory. The non-volatile memory is capable, in association with the processing circuitry, of storing a memory mapped parameterized collection class. The processing circuitry is operable, in association with the memories, to (a) instantiate an occurrence of the parameterized collection class, which references the collection class' data, in the volatile memory which is an image of the non-volatile memory obtained using memory mapping techniques, the parameterized collection class thereby becoming persistent, and (b) provide direct access by at least one routine executing in the processor to the persistent parameterized collection class, the persistent parameterized collection class surviving termination of the routine.

The principles of the present invention may alternatively be implemented in any suitable computer processing environment, whether micro, mini, mainframe, super or the like, including multi and parallel processing environments.

Figure 2:
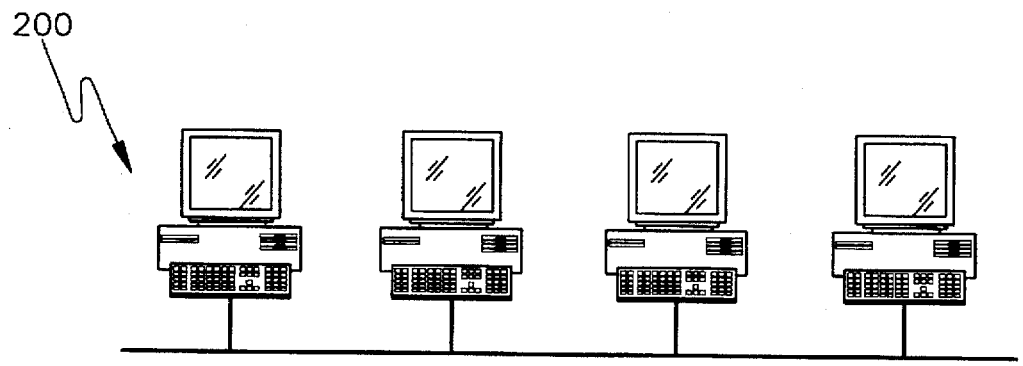
FIG. 2 illustrates three exemplary computer network topologies, each of which may provide a suitable alternative environment within which the present invention may suitably be implemented and operated.
Figure 2:
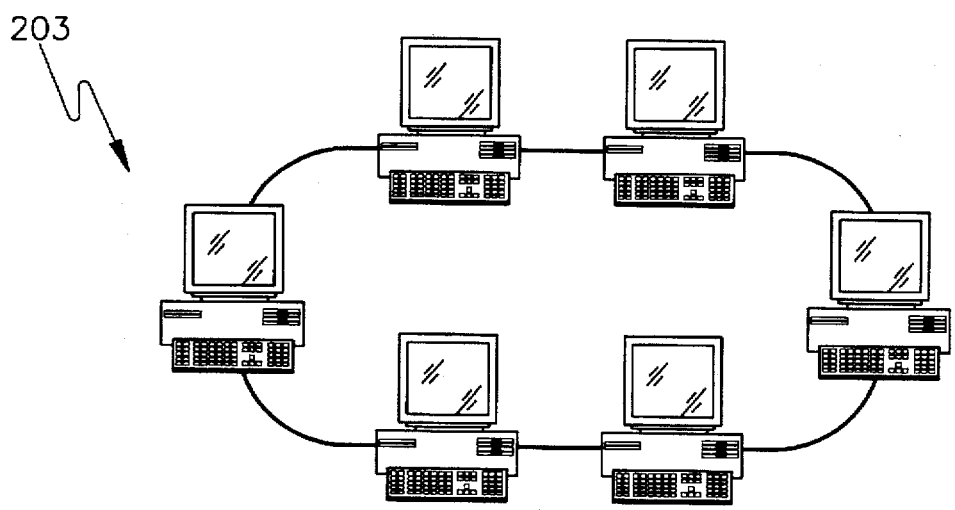
Figure 2:
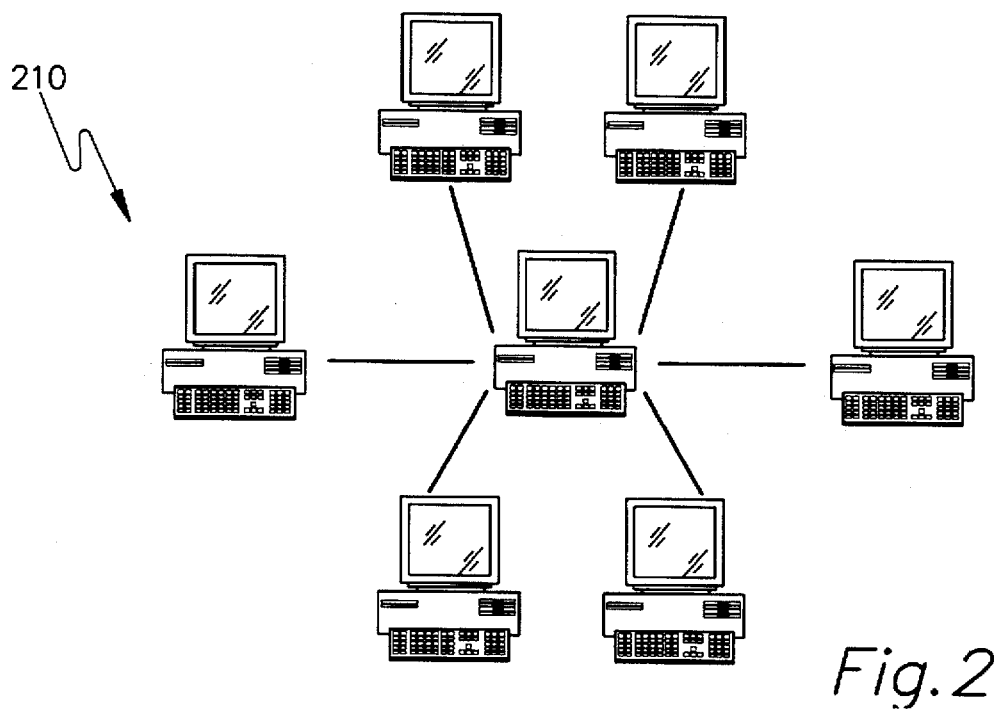

Turning now to FIG. 2, illustrated are three exemplary computer network topologies 200 to 210, each of which may provide a suitable alternative computer processing environment within which the present invention may suitably be implemented and operated. Illustrative network 200 is a conventional bus topology; Illustrative network 205 is a conventional ring topology; and Illustrative network 210 is a conventional star topology, all of which are well known in the art. FIG. 2, like FIG. 1, is illustrative only, alternate network topologies are also known in the art, as well as suitable combinations of the same. The phrase "computer system," therefore includes stand-alone computers as well as networks of computers.

Before undertaking more detailed discussions of advantageous embodiments of the present invention, the meaning of the following terms and phrases should be understood: the term "or" is inclusive, meaning and/or; the terms "include," "includes" or "including" mean inclusion without limitation; the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like; and the phrase "memory map" and derivatives thereof may mean a method by which a computer translates between logical and physical address space, and vise versa.

Figure 3:
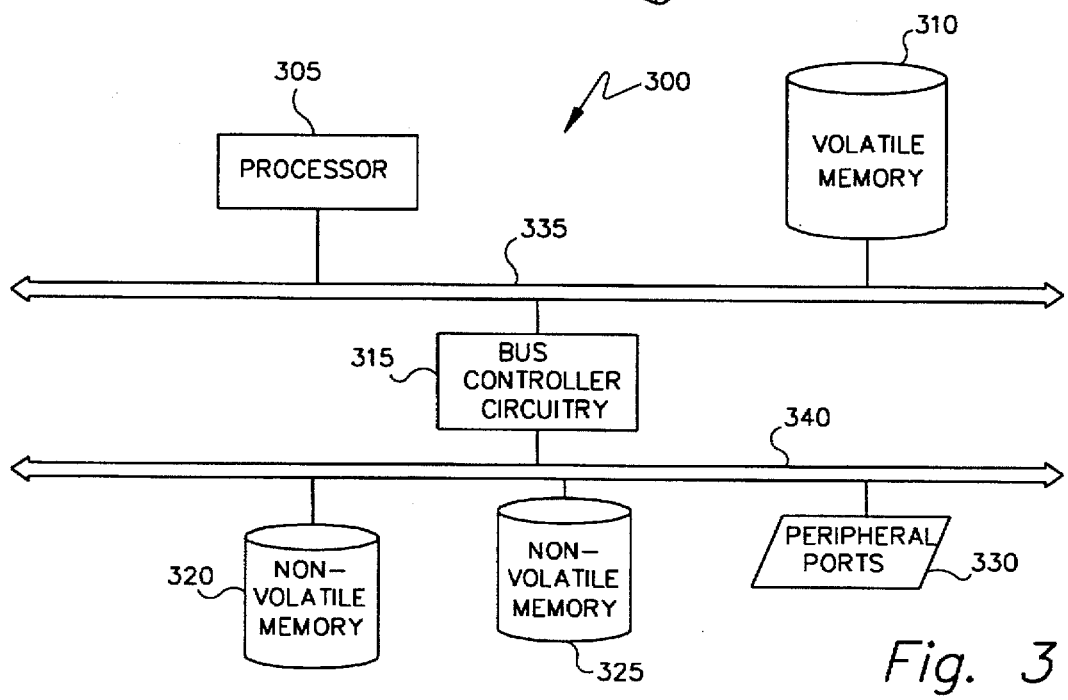
FIG. 3 illustrates a block diagram of an exemplary processing circuit, such as that associated with a personal computer, that may suitably provide an environment allowing instantiated parameterized collection classes to survive, or persist after, the termination or loss of a routine that instantiated them.

Turning now to FIG. 3, illustrated is a block diagram of an exemplary processing circuit (generally designated 300), such as that associated with exemplary PC 100, that may suitably provide an environment that allows instantiated parameterized collection classes to survive, or persist after, the termination or loss of the routine that instantiated (e.g., create, reference, operate, store, delete, etc.) them. Since the present invention is not limited to application in exemplary processing circuitry 300, FIG. 3, like FIGS. 1 and 2, is also illustrative.

Exemplary processing circuitry 300 includes a processor 305, conventional volatile memory (e.g., random access memory) 310, bus controller circuitry 315, a first conventional non-volatile memory (e.g., read only memory) 320, a second conventional non-volatile memory (e.g., a hard disk drive) 325 and a set of peripheral ports 330. An exemplary host bus 335 is shown and is suitably operative to associate processor 305, volatile memory 310 and bus controller circuitry 315. An exemplary input/output ("I/O") bus 340 is shown and is operative to associate bus controller circuitry 315, first non-volatile memory 320, second non-volatile memory 325 and the set of peripheral ports 330. The set of peripheral ports 330 may suitably couple I/O bus 335 to any one or more of a plurality of conventional peripheral devices for communication therewith. Included among the set of peripheral ports 330 may be one or more serial or parallel ports.

Bus controller circuitry 315 provides suitable means by which host bus 335 and I/O bus 340 may be associated, thereby providing a path and management for communication therebetween. Each of the illustrated buses 335 and 340 requires a drive current to carry signals thereon. The illustrative circuit accordingly operates in conjunction with a conventional system controller (not shown) that supplies the required drive current.

According to the illustrated embodiment, exemplary volatile memory 310 includes an operating system, such as WINDOWS® NT, UNIX®, HPUX or AIX as examples, that is capable of operating on one or more parameterized collection classes, or objects. Exemplary second non-volatile memory 325 functions as a persistent data store in which at least one parameterized collection class may be memory-mapped to volatile memory 310 according to the present invention. Exemplary processor 305 operates to instantiate an occurrence of one of the parameterized collection classes in exemplary volatile memory 310 from second non-volatile memory 325, causing the parameterized collection class to become persistent. Processor 305 also operates to provide direct access by at least one routine executing in the processor to the persistent parameterized collection class, such that the persistent parameterized collection class survives termination of the routine.

The present embodiment illustrates the cooperation of memory-mapping of files and parameterized collection classes. These two concepts are joined to permit, via memory-mapping, parameterized collection classes (an object that can be associated with a routine) to be instantiated once and thereafter remain, even after the routine that instantiated the same has been lost or terminated and even, in an advantageous embodiment, after the computer system itself has ceased to operate.

Persistent parameterized collection classes may be employed to define an object repository, or database, to thereby avoid the need to define meta-data (e.g., schema definitions, etc.) associated with conventional databases and their attendant administration and configuration burdens. Persistence not only relieves PC 100 and, more particularly, processing circuitry 300 from having to reinstantiate the persistent parameterized collection class, but this also prevents data contained within the persistent class from being corrupted or lost.

The persistent parameterized collection class, whether an object repository or not, may suitably define a plurality of persistent parameterized collection classes, which may interact with one or more routines, thereby achieving both flexibility and scalability. Those skilled in the art will understand the substantial advantages of the same.

In alternate advantageous embodiments, processing circuitry 300, which may be associated with exemplary computer systems 100, 200, 205 and 210, may, in whole or in part, be replaced by or combined with any suitable processing configuration, including multi and parallel processing configurations, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted also that while processing circuitry 300 illustratively includes a dual-bus configuration, alternate embodiments may include single-bus or greater than two-bus configurations. Further, conventional computer system architecture is more fully discussed in *The Indispensable PC Hardware Book*, by Hans-Peter Messmer, Addison Wesley (2nd ed. 1995) and *Computer Organization and*

*Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

Figure 4:
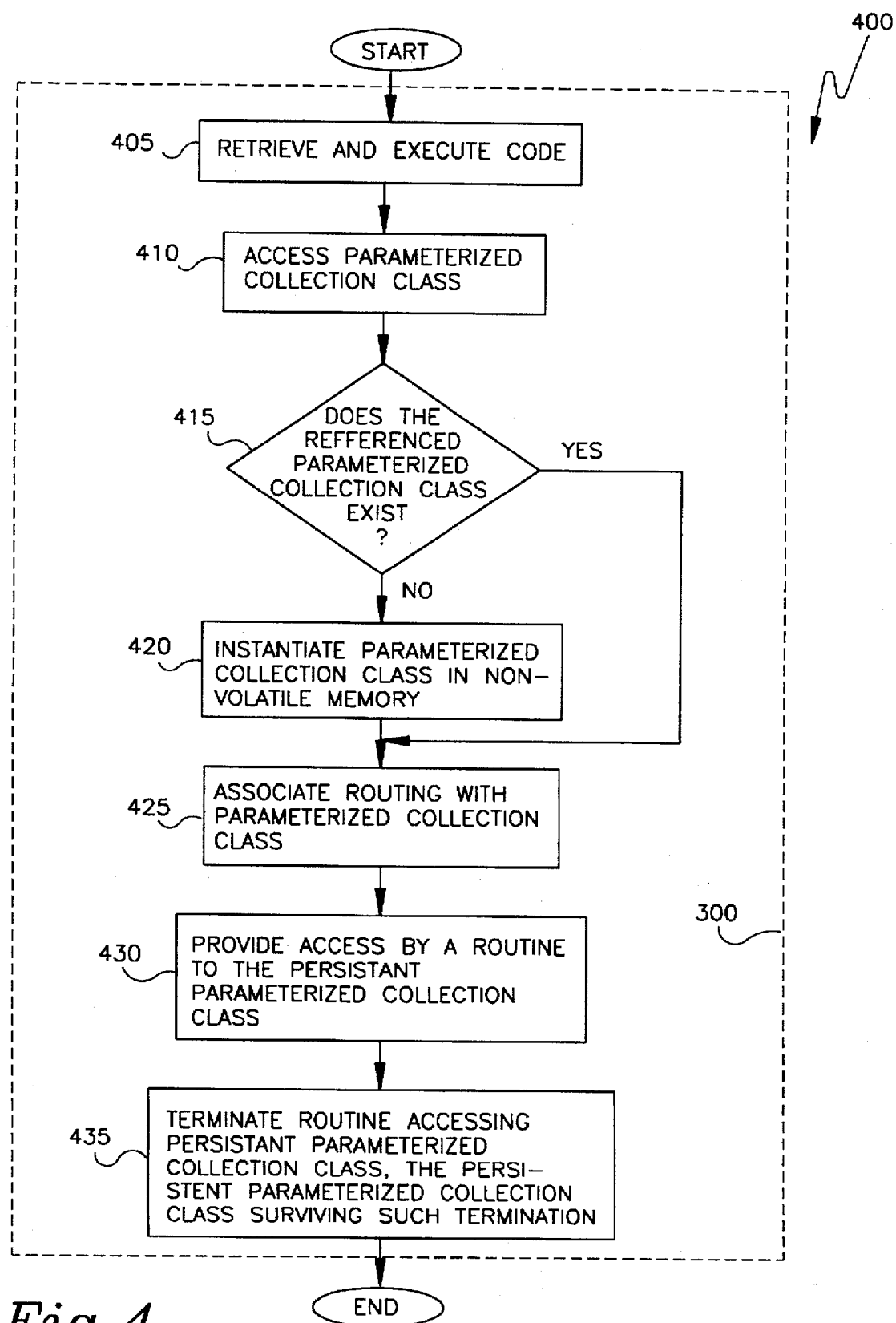
FIG. 4 illustrates a flow diagram of an exemplary method of operating a computer for allowing instantiated parameterized collection classes to survive the termination or loss of a routine that instantiated them according to the present invention.

Turning to FIG. 4, illustrated is a flow diagram of an exemplary method (generally designated 400) of operating a computer processing environment (e.g., PC 100, networks 200 to 210, processing circuitry 300, etc.) for allowing instantiated parameterized collection classes to survive the termination or loss of a routine that instantiated them according to the present invention. For the purposes of illustration, reference is made to FIG. 3.

To begin, processor 305 retrieves and executes code (e.g., object code, etc.) from volatile memory 310 via host bus 335 (process step 405). Some portion of the executable code references a parameterized collection class, or object, and directs processor 305 to interact with the object in some conventional manner (process step 410).

Processor 305 retrieves and executes a routine from volatile memory 310 via host bus 335 to detect whether the referenced parameterized collection class exists (decisional step 415). Existence of the parameterized collection class may be in at least one of volatile memory 310 or second non-volatile memory 325 according to the illustrated embodiment.

If the parameterized collection class does not exist (NO branch of decisional step 415), the routine instantiates the parameterized collection class in second non-volatile memory 325 (process step 420) and then instantiating an image of the parameterized collection class in volatile memory 310, associating itself with the newly-instantiated parameterized collection class during the process of instantiation (process step 425). Instantiation of the parameterized collection class in memory 310 causing the parameterized collection class to become persistent.

The persistent parameterized collection class is memory-mapped in non-volatile memory 325. According to the present embodiment, the persistent parameterized collection class is divided into a plurality of pages and transferred from second non-volatile memory 325 to volatile memory 310 via I/O bus 340, bus controller circuitry 315 and host bus 335 as a function of a demand for one or more of the plurality of pages. Demand paging is employed to allow at least a single object to be accessed efficiently and safely.

If the parameterized collection class exists (YES branch of decisional step 415), the routine simply associates itself with the same or an instantiated instance of it (process step 425). Again, instantiation of an image of the parameterized collection class in memory 310 from non-volatile memory 325 causes the parameterized collection class to become persistent.

Second non-volatile memory 325 functions as a persistent data store according to the principles of the present invention. Although the illustrated embodiment uses non-volatile memory as the persistent data store, the persistent data store may be any suitable memory or storage device capable of storing the persistent parameterized collection class, even after the loss or termination of the routine with which the persistent parameterized collection class is associated. The persistent data store may exist in a computer system's main memory and therefore be subject to loss upon interruption of power to the computer system.

Processor 305 provides direct access by at least one routine executing therein to the persistent parameterized collection class in volatile memory 310 (process step 430). In an advantageous embodiment, the operating system may support execution of separate execution threads in processor 305, the processor instantiating an occurrence of the persistent parameterized collection class in each of the separate execution threads, most preferably by mapping a shared single instance of the associated collection into address space of the instantiated thread, thereby providing direct access by routines executing within each of the separate execution threads to the persistent parameterized collection class. The present invention therefore can operate in a multithreaded, multitasking environment.

The routine having direct access to the persistent parameterized collection class is terminated and the persistent parameterized collection class survives such termination of the routine (process step 435). The cooperation of memory-mapping of files and parameterized collection classes permit, via memory-mapping, parameterized collection classes to be instantiated once and thereafter remain, even after the routine or thread of execution that instantiated them has been lost or terminated and even, in an advantageous embodiment, after the computer system itself has ceased to operate.

In a most preferred embodiment to be described in greater detail hereinbelow, the persistent parameterized collection class is an object repository—the broad principles of the present invention apply equally advantageously to objects and object repositories of any type—associated with a real-time process control facility—the broad principles of the present invention are not limited to this embodiment type. In this embodiment, the routine queries the persistent parameterized collection class to extract data therefrom. The routine can therefore communicate data with the persistent parameterized collection class. This communication can be bidirectional, which is particularly advantageous in a real time process control system.

In an alternate embodiment, the parameterized collection class includes access semantics selected from the group consisting of: (1) associative array access semantics and (2) iterator access semantics. Those skilled in the art will understand that procedural access semantics are advantageously employed to communicate with the persistent parameterized collection class. However, the broad scope of the present invention contemplates other modes of communication with other parameterized collection classes, that may be made persistent through the principles of the present invention.

An exemplary software embodiment implementing many principles of the present invention is included herein as APPENDICES A to F of a microfiche appendix, which is incorporated herein by reference. This embodiment is written in conventional C++ and may compiled and suitably executed in a WINDOWS® NT environment. Alternate embodiments have been implemented in a UNIX® environment and is commercially available from the Industrial Automated Control ("IAC") Group of HONEYWELL INCORPORATED in Phoenix, Ariz., United States of America, product name OPEN DDA, RELEASE 200.

More particularly, APPENDIX A includes the following files, namely, pdaxshardmap.cpp, pdaxshardmap.c and pdaxshardmap.h. These files are primarily concerned with a parameterized collection class (pdaxSharedMap<class S, class T>) that implements a persistent associative array. APPENDIX B includes the following files, namely, pdaxshardmapo.c and pdaxshardmapo.h. These files are primarily concerned with a parameterized smart pointer class (pdaxSharedMapiter<class S, class T>) that is an iterator used to iterate through the values in the associative array. APPENDIX C includes the following files, namely, pdaxmmappool.cpp and pdaxmmappool.h. These files are primarily concerned with implementation of a parameterized class (pdaxMmapPool<class S, class T>) that manages mapped memory associated with the memory mapped file—this class is encapsulated by the class (pdaxSharedMap<class S, class T>). APPENDIX D includes the following files, namely, testexample01.cpp, testexample02.cpp, testexample03.cpp, testexample04.cpp and testexamples.h. These files are separate programs that may be used to demonstrate usage of the class. APPENDIX E includes the following files, namely, testmap.cpp and bindingdef.h. These files are primarily concerned with regression testing. APPENDIX F includes the following files, namely, pda_status_consts.h and pdattypes.h. These files are primarily concerned with non-standard include files.

For purposes of further illustrating aspects of the present invention, it is advantageous to use exemplary application source code, namely, testexample01.cpp, to illustrate how a pdaxmmappool class initializes and manages mapped memory, and how testexample.cpp instantiates the parameterized collection class and stores a new value into the same. The following is source code extracted from testexample01.cpp:

```
void main() {
    ParamKey paramKey;
    ParmId paramId;
    pdaxSharedMap<classParamKey,ParamId>paramIdArray("param
        IdArray", 1000, 500, 50);
    for (int I=();i<5;i++) {
        cout << "ParamName?";
        cin >> paramKey.paramName;
        padKey (paramKey.paramName);
        cout << "ParamId?";
        cin >> paramId.id;
        paramIdArray.Lock ();
    }
        ParamIdArray [paramKey] = paramId;
    }
    paramIdArray.Unlock ();
}
``` is executable to cause an associative array, "paramidArray," to be created of type pdaxSharedMap. The exemplary parenthesized constructor arguments are passed to a suitable constructor in pdaxsharedmap.h, where the in-line code makes a call to initialize a memory mapped file that may be suitably used to allocate and free memory. This is accomplished by pdaxsharedmap.h, and, more particularly, with a call to mypool.Init—note that the filename passed in as a first constructor argument is passed as follows:

mypool.Init(size of(pdaxSharedMapnode<S,T>), max, min, extra, filename, callback);

Those skilled in the art will note that mypool.Init is declared as type pdaxMmapPool in class pdaxSharedMapbase (approximately line 415 in pdaxsharedmap.h), and pdaxSharedMap is derived (publicly) from pdaxSharedMapbase (approximately line 510 of pdaxsharedmap.h).

PdaxMmapPool.Init (beginning approximately line 125 of pdaxmmappool.cpp) first initializes member data and performs calculations to determine the size of the memory mapped file, then instantiating (e.g., opening, creating it if necessary, etc.) and memory maps the specified file (beginning approximately at line 185).

Most preferably, a check or determination is made—(a) does the memory map need to be initialized for a first time, (b) does the memory map need to be recovered due to some inconsistency, or © is the memory map in a consistent state and ready to use.

If a known location in the memory map has not been initialized (approximately line 530) then the data members of the MmapPool_header class are initialized inside the mapped memory (approximately lines 645 to 680). These data members, by virtue of the memory map being shared memory, allow multiple threads of execution to operate directly on the memory mapped data structures—inside of each thread of execution's virtual address space. These data members may also be persistent as a side effect of existing in the mapped memory. In the illustrated embodiment, PdaxMmapPool encapsulates this class.

If a pointer (e.g., poolHeader) to the mapped memory is successfully assigned a value, pdaxMmapPool.Init determines the number of seconds that have elapsed since the last time the system was restarted (beginning at approximately line 500). This value (e.g., tmpBootTime) will be used to detect if the mapped file is potentially inconsistent due to a system failure (beginning approximately at line 550).

Most preferably, checks are also made for allocation of the memory map at a different virtual address or, alternatively, if the memory map is marked "dirty," often indicating that someone locked the memory map but failed to unlock it and, more generally, that the integrity of the data structures in the memory mapped data is suspect (approximately lines 550 to 555), a "dirty" flag may be suitably set "true" or "on," which will cause fix up routines to recover the memory mapped data structures.

To illustrate the addition of a new object to a collection (e.g., to the associative array), consider the following line of source code from testexample1.cpp (approximately line 45):

paramIdArray [paramKey]=paramId;

This line of code includes an expected associative array's semantics, storing the value of parmId into paramIdArray. This may be accomplished using a parameterized collection class, pdaxShareMap, which may be suitably adapted from conventional map classes, such as that provided in USL C++ STANDARD COMPONENTS.

To allocate and access an adapted map's AVL tree from the memory map, consider the implementation of pdaxShareMap<S,T>::operator[ ]
(beginning approximately at line 403 of pdaxsharedmap.c). Note that several locations calling Newnode, namely, pdaxSharedMap<S,T>::Newnode
(beginning approximately at line 355 of pdaxsharedmap.c), which contains the following line of code:

pdaxSharedMap<S,T>*p=(pdaxSharedMap<S,T>*) mypool.Alloc( );

This line calls void *pdaxMmapPool::Alloc( ) (beginning approximately at line 1210 of pdaxmmappool.cpp), this code then allocating a block of memory from the memory mapped file (approximately lines 210–1295).

Later, in pdaxShareMap<S,T::Newnode, the following line of code is called, namely, pdaxSharedMapbase::Newnode (pdaxSharedMapnodebase*ptr)

(beginning approximately at line 375 of pdaxsharedmap.c). Within       pdaxSharedMapbase::Newnode (pdaxShareMapnodebase*ptr) (beginning approximately at line 155 of pdaxsharedmap.cpp) one or more pointers to the allocated pdaxSharedMapnodebase are saved as member data inside of other pdaxShareMapnodebase instances, also within the mapped memory, thereby creating and maintaining an AVL tree entirely in mapped memory. Note that three pointers (L__, R__ and U__) prepend each value stored in the collection to create the AVL tree and that the values and the pointers reside inside the mapped memory.

Figure 5:
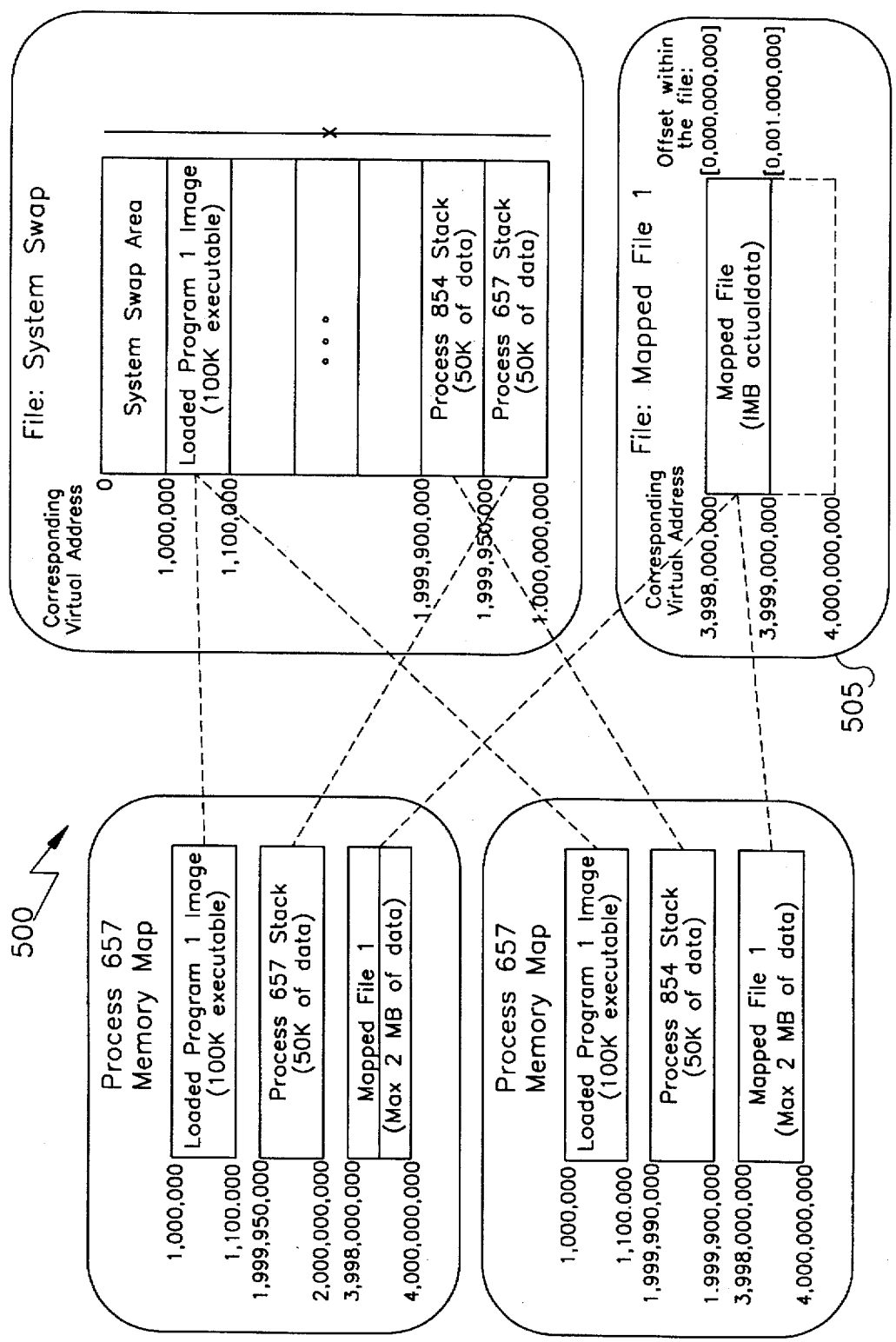
FIG. 5 illustrates a block diagram of an exemplary memory configuration for memory mapping files according to an exemplary embodiment of the present invention.

Turning now to FIG. 5, illustrated is a block diagram of an exemplary memory configuration (generally designated 500) for memory mapping files according to an exemplary embodiment of the present invention. According to the exemplary embodiment, a developer is provided through pdaxSharedMap and pdaxShareMapiter classes for saving data in a persistent data store. The data-store may be suitably accessed both positionally and as an associative array. Partial updates and system failures are reliably detected and recovery occurs substantially automatically.

Access to data in the parameterized collection class 505 occurs at virtual memory speeds through the use of memory mapped files. Memory mapping a file establishes a mapping between a calling routine's virtual address space and the file being mapped. As is illustrated, the relationship between virtual memory addresses and the physical file which may be used to read/write page images as part of a virtual memory demand paging mechanism—noting that two routines may share the same virtual address space.

In this example, Program 1 is loaded into virtual memory at an address of 1,000,000. This same image (in this case read/only) is shared by processes 657 and 854, illustrating that the mapped file is loaded into virtual memory at an address of 3,998,000,000. This image (in this case a read/write parameterized collection class) is shared by processes 657 and 854. The exemplary system tracks which files to use for reading/writing page frames when page faults occur. Those skilled in the art will note that virtual memory addresses and file offsets within the swap file differ depending on the area of memory being mapped.

Figure 6:
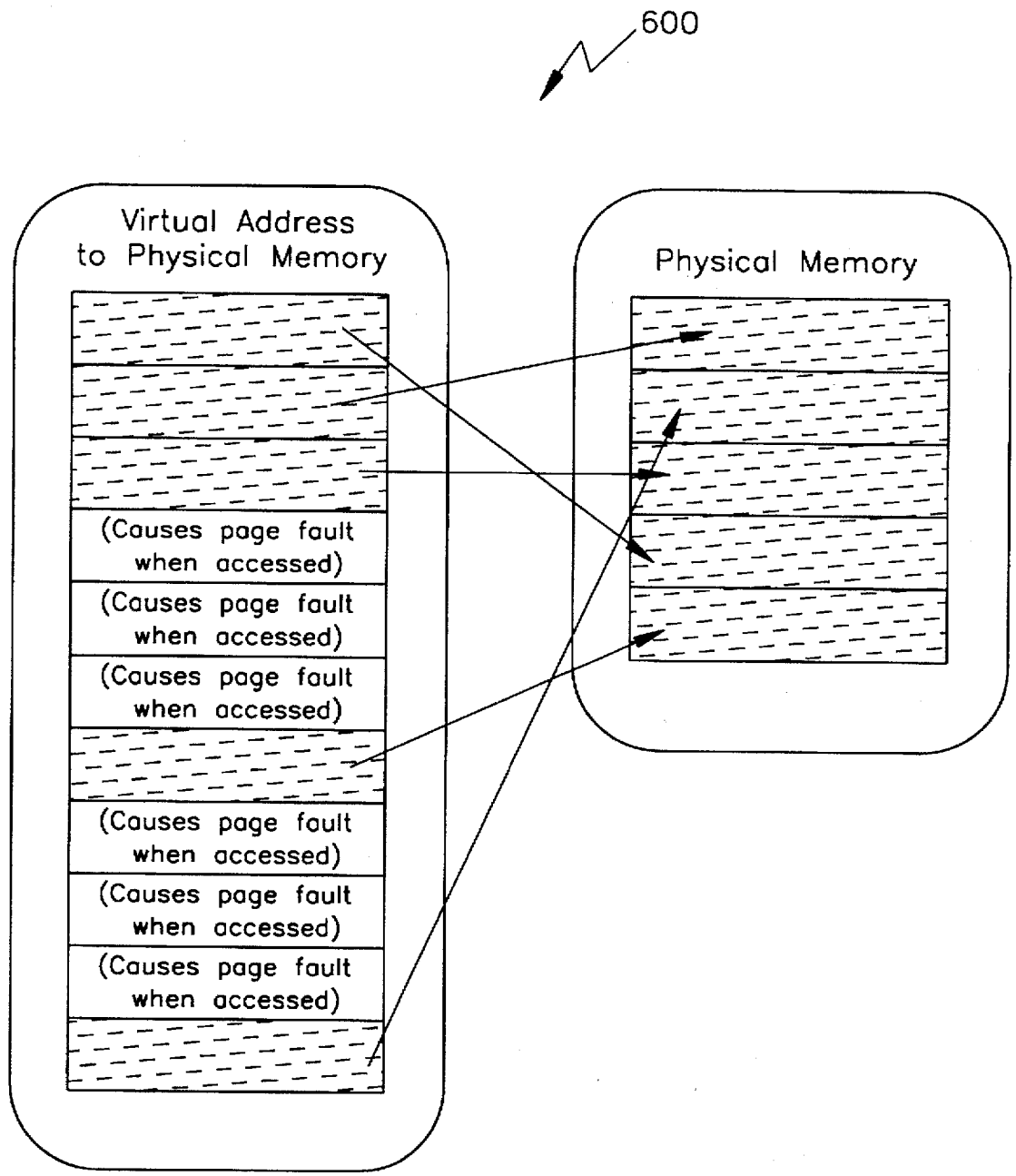
FIG. 6 illustrates a block diagram of an exemplary memory configuration for performing demand paging according to an exemplary embodiment of the present invention.

Turning now to FIG. 6, illustrated is a block diagram of an exemplary memory configuration (generally designated 600) for performing demand paging according to an exemplary embodiment of the present invention. The concept of demand paging is known. Demand paging permits a routine to be loaded into non-contiguous memory in fixed size chunks called pages or page frames. This scheme helps eliminate fragmentation associated with systems that do not support demand paging. It also allows the size of "virtual" memory to be larger that physical memory. Conceptually pointers are used to translate virtual memory addresses into physical memory pages.

In the case of routines loaded into virtual memory and per process stacks, pages that cannot fit into physical memory are copied into a swap file. When a memory reference is made to a location that is not within a page loaded in physical memory, a page fault exception is raised. The interrupt handler or the like for this exception checks for a free page slot in memory. If none is found, a page frame must be selected and removed, or deleted, and if it has been modified, then swapped to disk (e.g., second non-volatile memory 325). After the free physical page is found, the requested virtual page is loaded into physical memory (e.g., volatile memory 310).

Memory mapped files operate in a similar manner. The difference is that the file is not loaded into memory in a similar manner to that a loader loads an executable. Instead the demand paging mechanism is used to load a page at a time into memory whenever a reference is made to a virtual address that has been mapped to a file and does not yet exist in physical memory. The system then handles the page fault by loading a page from the memory mapped file into a free page in physical memory. When a page in physical memory which corresponds to a memory mapped file is targeted to be freed, the page is written to the memory mapped file.

According to the illustrated embodiment, exemplary reliable mechanisms, or routines, automatically rebuild internal pointers in the event of partial updates due to a process/thread or system failure. These mechanisms are also used when the virtual memory address assigned to the base of the maps file changes (e.g., when the first process/thread to reference the file "maps" it into memory).

Detection of a process/thread failure occurs as follows: When a process/thread locks the parameterized collection class, a flag is set in the mapped memory. If a failure occurs before unlocking the parameterized collection class, the flag remains set. When the next process/thread locks the parameterized collection class, a check is performed to see if the flag is set. If it is, a function is invoked to reconstruct all pointers, and other data may also be updated.

Detection of a system failure occurs as follows: When a parameterized collection class is created for the first time, the exact time at which the system was last re-booted is recorded in mapped memory. If the system fails, it will have a different reboot time when it restarts. Each time a shared map (e.g., pdaxSharedMap) is instantiated, the re-boot time is checked. If the times differ by more than a minute (allowing for reboot time calculation anomalies), the reconstruction method is invoked.

Note that when a parameterized collection class is created for the first time, the virtual address assigned to the mapped file is recorded in the mapped file. Each time a shared map (e.g., pdaxSharedMap) is instantiated, the virtual address returned when the file is mapped is compared against the recorded previous allocated virtual address. If the addresses differ then the pointers are reconstructed.

The pdaxSharedMap class has a member function that, when invoked, uses the contents of the file to rebuild a new AVL tree and to rebuild a new free list of memory. The contents of the file consists of an unbounded array of fixed length elements, each with a flag indicating if the element was deleted. The delete flag for the elements, from the start of the file to the end of the file, is examined. If an element is flagged as deleted, it is added to the "free" list, otherwise it is added to the newly created AVL tree. This technique covers the case where pointers are partially updated (e.g., as is the case when a process/thread is prematurely terminated), as well as the case where one or more modified pages have not been written to disk (e.g., as is the case where a system failure occurs).

Note that change in system page size can be detected when the shared map is instantiated. If the previous page size used by the map file is different than the current system page size, an error may be reported. A future revision will attempt to reconstruct the map file. In event of data loss, recovery can be done by using a backup copy of the map file. The backup copy is most preferably stored in a different storage device.

Since the operating system and underlying mass storage devices are typically only able to substantially guarantee "all-or-nothing" updates of a single page-frame at a time, memory blocks, when allocated, should not span across a page-frame boundary—this functionality is provided by the class that manages the memory mapped pool (e.g., pdaxMmapPool).

Note further that contention on a UNIX, HP-UX, AIX, etc. machines may be managed by a binary semaphore residing in the memory mapped file. Similarly, contention on a WINDOWS N and like machines where it is typically not possible to locate the binary semaphore in the memory mapped file may be managed using mutex. In the event of a process failure, the semaphore is cleared leaving a locked flag set in the mapped memory.

Figure 7:
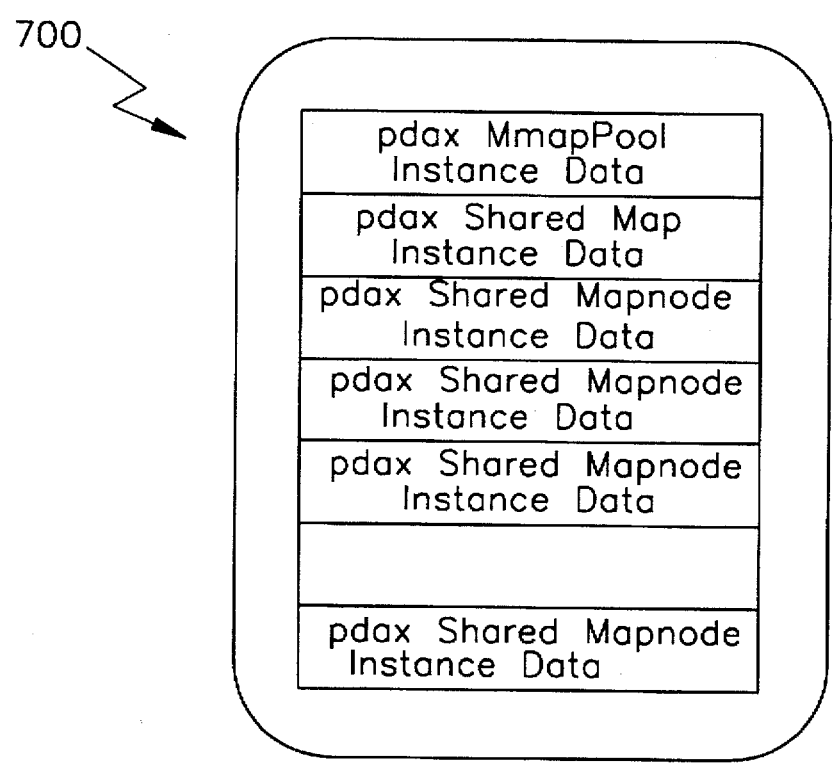
FIG. 7 illustrates a block diagram of an exemplary memory configuration for performing memory management according to an exemplary embodiment of the present invention.

Turning now to FIG. 7, illustrated is a block diagram of an exemplary memory configuration (generally designated 700) for performing memory management according to an exemplary embodiment of the present invention. To provide for multiple routines concurrently accessing parameterized collection class 505, substantially the instance data for all shared classes resides within the shared memory associated with parameterized collection class 505 as illustrated herein.

A special purpose memory allocation class (e.g., pdaxMmapPool) may be provided for managing a pool of fixed size elements located in the memory mapped file. The elements most preferably do not cross a page-frame boundary (for integrity reasons). The class provides room at the base of mapped memory to instantiate itself, and may provide a mechanism for a shared collection class (e.g., pdaxSharedMap) to instantiate itself before any elements are allocated.

The pdaxMmapPool class manages a pool of fixed size elements, in the present case, pdaxSharedMapnode—its instance data includes a semaphore, a pointer to a free list of elements, and a pointer to the end of memory.

Most preferably, the base of the memory map contains class information related to managing the mapped memory pool; next memory consists of class information related to the shared collection class; and an array of elements exists.

Figure 8:
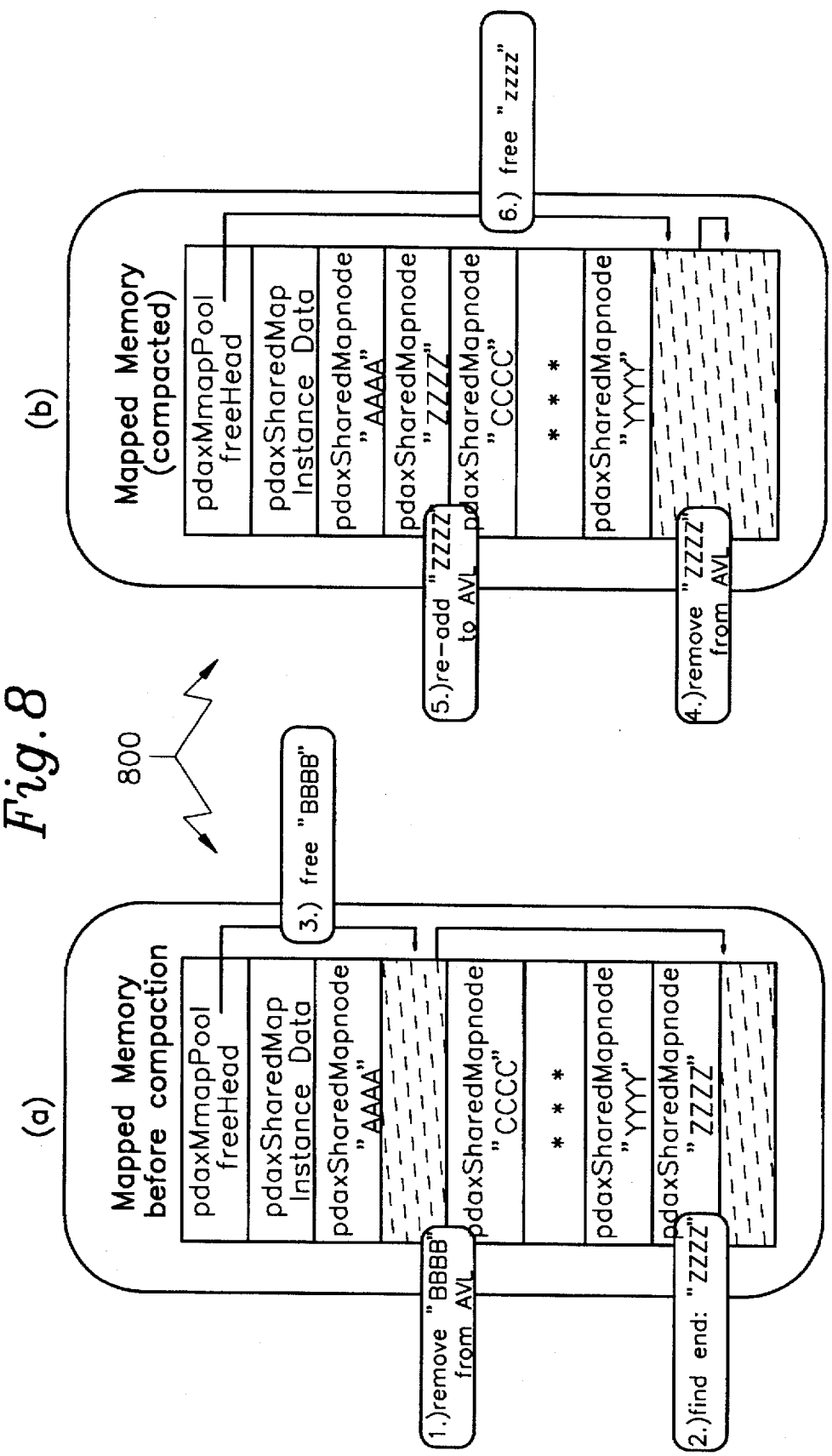
FIG. 8 illustrates a block diagram of an exemplary memory configuration for performing compaction according to an exemplary embodiment of the present invention.

Turning now to FIG. 8, illustrated is a block diagram of an exemplary memory configuration (generally designated 800) for performing compaction according to an exemplary embodiment of the present invention. Exemplary collection class pdaxSharedMap is responsible for ensuring memory is always compacted. This compaction normally occurs every time an item is removed, however, if a pdaxSharedMapiter has been instantiated, the compaction is deferred until the parameterized collection class is unlocked.

The technique for compacting memory involves filling in "holes" created when an element (e.g., pdaxSharedMapnode) is removed. To facilitate filling in "holes" the underlying memory pool, pdaxMapPool is responsible for maintaining the free list in stored (ascending) order by address (low memory addresses first) and for providing a method for finding the last element (e.g., pdaxSharedMapnode) in memory.

This technique is best demonstrated in the following example:
1. "BBBB" is logically deleted by pdaxSharedMap from its AVL tree.
2. pdaxShareMap locates the last element in memory by making and invoking the end ( ) method on its instance of pdaxMmapPool—note, end ( ) is most preferably invoked before freeing the element that creates the "hole", since all the end ( ) method does is "peek" at the address that would be allocated if alloc( ) were invoked.
3. PdaxSharedMap then invokes the free method on its instance of pdaxMmapPool. The freed element, pdaxSharedMapnode, is added to the front of the sorted list memory addresses.
4. "ZZZZ" is logically deleted by pdaxSharedMap from its AVL tree.
5. "ZZZZ" is re-added to the AVL—this updates the AVL pointers to their new location.
6. "ZZZZ" is freed, thereby being added to the front a contiguous list of free elements at the end of the memory.

Figure 9:
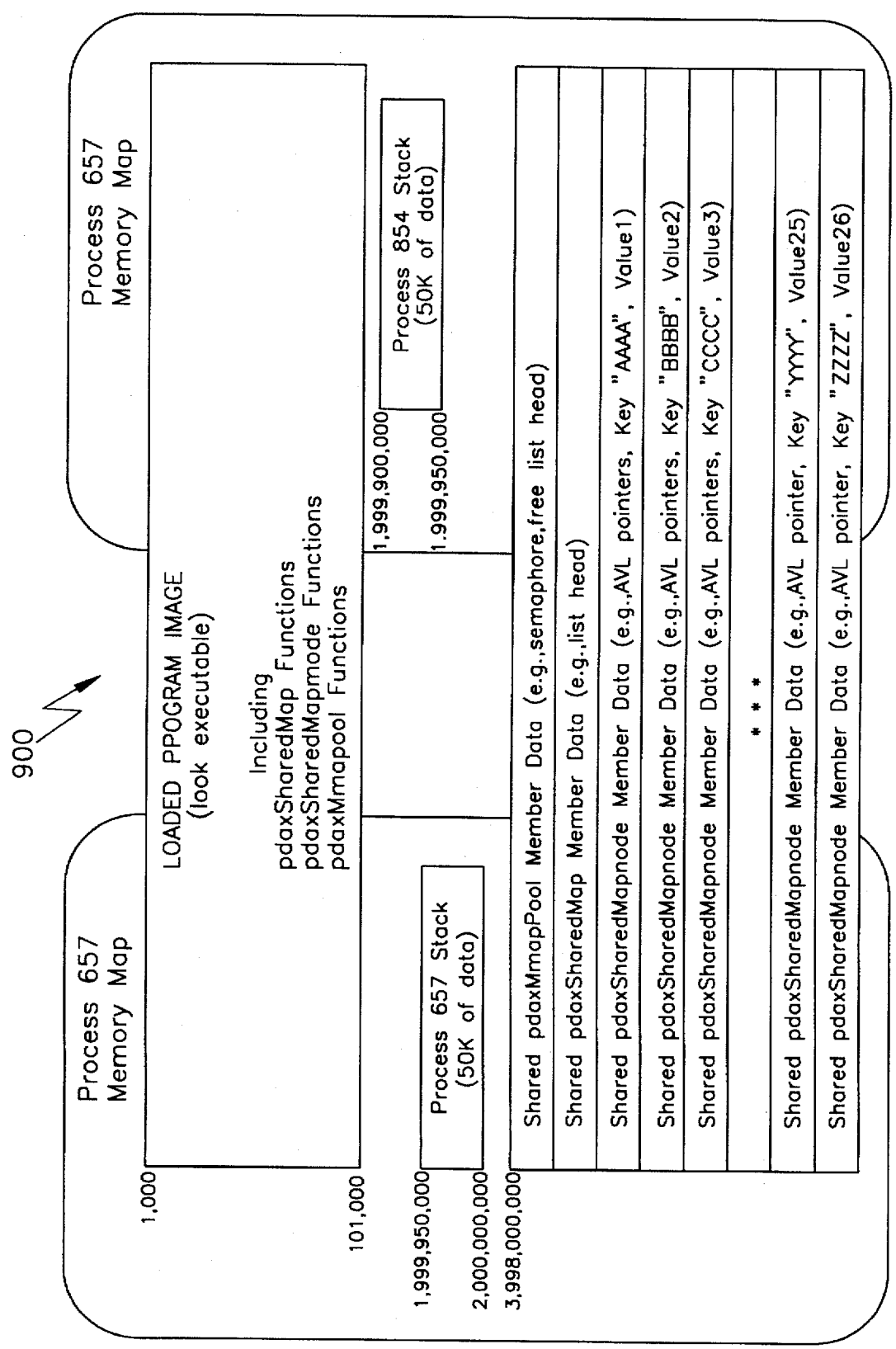
FIG. 9 illustrates a block diagram of an exemplary memory configuration for performing communication and synchronization among threads of execution may be accomplished according to an exemplary embodiment of the present invention.

Turning now to FIG. 9, illustrated is a block diagram of an exemplary memory configuration (generally designated 900) for performing communication and synchronization among threads of execution may be accomplished according to an exemplary embodiment of the present invention. Communication and synchronization may be accomplished by placing instance data for the following objects in mapped memory, and coordinating accesses to the shared object with a binary semaphore.

1. PdaxMmapPool—the object manages the shared memory map and coordinates access to the pool.
2. PdaxSharedMap—the collection object maintains a shared AVL tree of pdaxSharedMapnodes.
3. PdaxSharedMapnode—the object contains AVL pointers, keys and other values.

In the same way that multiple processes can access a single copy of a routine, memory mapped files are sharable, providing virtual memory access to the data within the mapped file. Once memory is mapped to a file by at least one process, subsequent processes that map memory to the same file may do so at the same virtual address—meaning that memory pointers within the map are valid for all concurrent users of the mapped file. Alternate embodiments may allow the file to be mapped at different virtual addresses through the use of indirect addressing or some similar technique According to the exemplary embodiment, persistence occurs naturally as a side-effect of being implemented as a memory mapped file. A method pdaxSharedMap::Sync( ), may be provided for doing an immediate one-time synchronous update of modified (e.g., memory resident) images to the underlying mapped file—the Sync( ) routine does not return until the update has occurred., except when Sync( ) is explicitly invoked, writing to disk of modified memory mapped occurs asynchronously and typically runs a few seconds behind the update memory.

Exemplary use of Sync( ) is optional and is discouraged. The reasoning behind this is (1) the recovery mechanisms of the parameterized collection class provides that whatever is on the disk will be recovered—there is no need to worry about corrupted pointers as they may be suitably rebuilt; (2) generally, "meaningful" updates to the parameterized collection class data occur infrequently while at the same time, inconsequential updates (e.g., access times) may occur frequently—when used in developer implementations, the parameterized collection class is primarily read-only, with the possible exception of usage information; (3) when Sync( ) is called, all modified pages in memory are most preferably written to disk (e.g., both the "meaningful" and "inconsequential" updates); and (4) a primary consequence of loosing a few seconds worth of data, assuming a system crashes immediately after a write, is that data may have to be re-fetched.

The exemplary embodiment includes a backup mechanism to make backup copies of the memory mapped file, normally to another physical device. A method, pdaxSharedMap::Backup(cons char* filename), is provided for copying the memory mapped file to a specified path name. The method makes a "snapshot" of the memory mapped file by copying pages to the path name. The memory mapped file may be locked while each page is copied to a temporary write buffer. While the write of the temporary buffer occurs, the memory mapped file is unlocked, allowing other processes/threads to run. This strategy was selected since the backup is a "snapshot," and there are considerable performance penalties associated with locking the parameterized collection class while possibly copying the entire memory mapped file.

The present backup method, differs from an ordinary file copy in at least two ways. First, pages are copied while the map is locked, eliminating the possibility of partial updates. Second, mechanisms are provided to detect when an element is moved to a page that has already been written, such as when compaction occurs following a delete. In such a case the backup is restarted to ensure that a snapshot of the moved element is written to the specified file. This mechanism is considered adequate, given the low likelihood of elements being deleted during the same few seconds a backup is occurring—although a scheme may be implemented that will backup continuously, retry or thrash in the event elements are continuously deleted.

Figure 10:
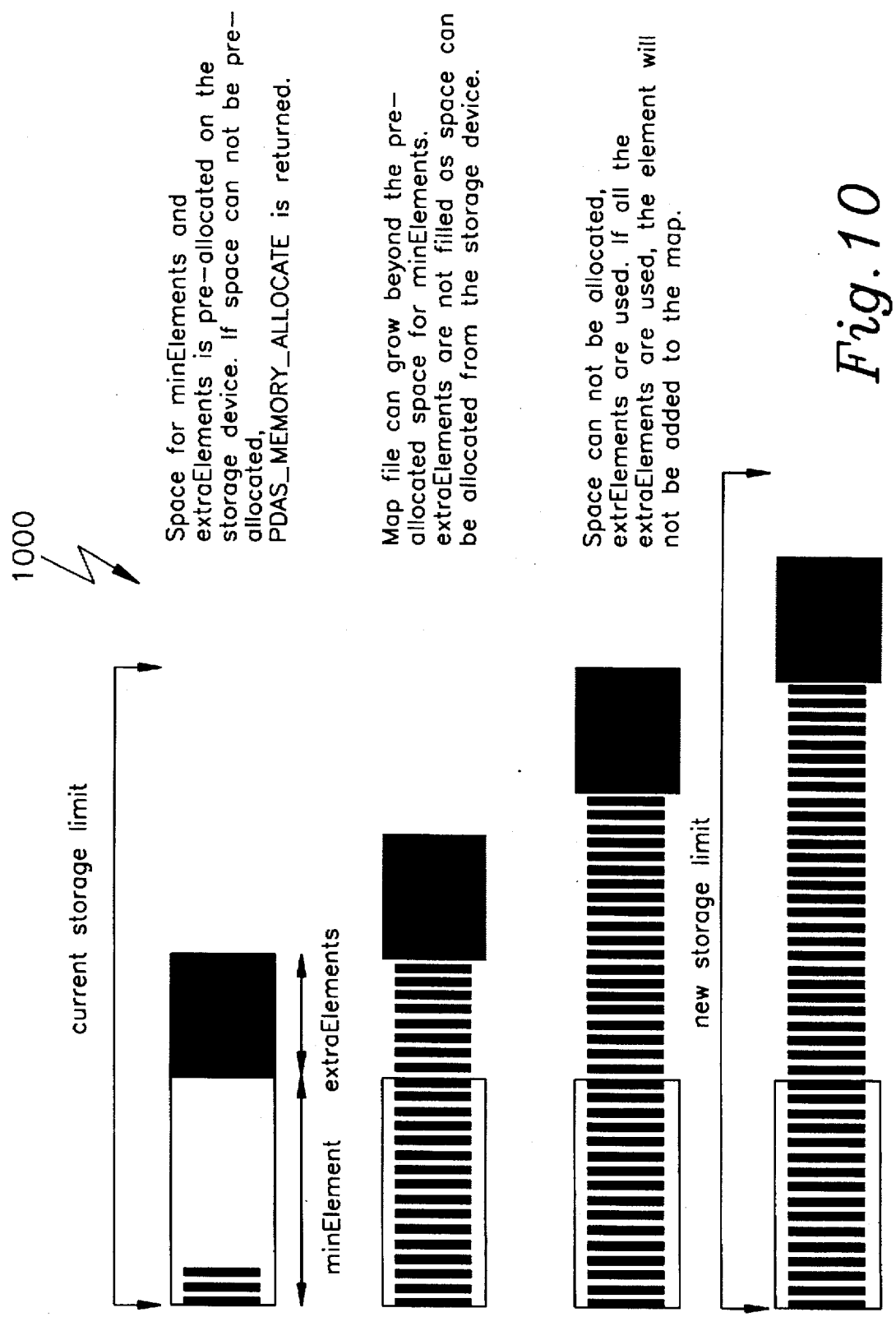
FIG. 10 illustrates a block diagram of an exemplary memory configuration for performing communication and synchronization among threads of execution may be accomplished according to an exemplary embodiment of the present invention.

Turning now to FIG. 10, illustrated is a block diagram of an exemplary memory configuration (generally designated 1000) for performing communication and synchronization among threads of execution may be accomplished according to an exemplary embodiment of the present invention. It should be noted that as a memory mapped file grows, there is a possibility that the storage device will reach its storage limit and will not allow more elements to be added. To avoid insufficient memory problems, a mechanism may be provided to preallocate the necessary file space at the time of instantiation. This may be done by specifying the minimum number of elements in the map ("minElements"). If successful, the map file will store the minimum number of elements without worry of insufficient memory. If the preallocation fails, pdaxSharedMap is not instantiated. This mechanism is particularly effective in preventing memory problems when the number of elements in the map can be pre-determined.

The map file may grow beyond the pre-allocated space after the preallocated space has been occupied—when there are more than the minimum number of elements. Out of memory problem may still occur in this situation. One advantageous approach is to have the map file contain extra space to allow addition of elements while effort to increase memory is undertaken. Extra space may be created by specifying the number of extra elements (e.g., extraElements) when calling pdaxSharedMap constructor. The concept of extra elements is similar to that of minimum elements, space for the extra elements is pre-allocated in the map file. The extra elements are not filled until the system is out of memory at which time they provide a buffer while the disk space condition is remedied. If all the extra elements are used and no memory is available, the element is not added to the map.

According to the illustrated embodiment, a revision field may also be maintained for purposes of migrating sites to new revisions of the parameterized collection class without having to stop operations—the revision field is to be used by later revisions of the parameterized collection class. Should additional information need to be added to the instance data, then the newer revision parameterized collection class is responsible for expanding the instance headers and fixing up any pointers thereby allowing earlier revisions of the parameterized collection class code to continue operating concurrently with the new revision code.

In addition, the illustrated embodiment uses the underlying operating systems file access security. When parameterized collection classes are instantiated they are created with owner read and write file access permissions. It is the responsibility of any software granted access to memory mapped file to enforce any additional security policies. Although alternate embodiments may implement other suitable security mechanisms.

Figure 11:
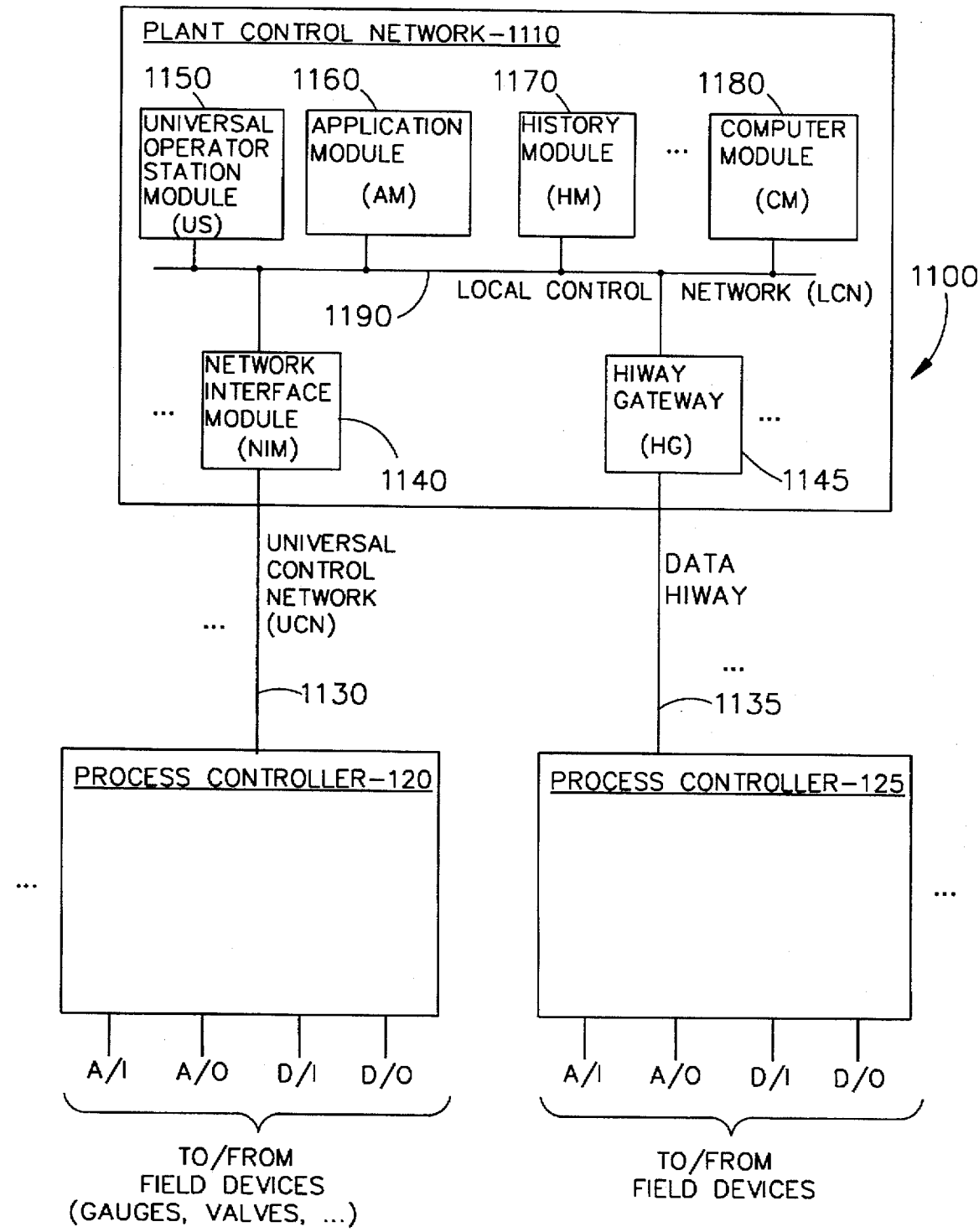
FIG. 11 illustrates a block diagram of an exemplary process control system in which the system and method of the present invention may be suitably implemented and operated.

Referring lastly to FIG. 11, illustrated is a block diagram of an exemplary process control system (generally designated 1100) in which the system and method of the present invention may be suitably implemented and operated. Process control system 1100 includes a plant control network 1110 coupled to a plurality of process controllers 1120, 1125 via a network interface module ("NIM") 1140 and highway gateway ("HG") 1145 over a universal control network ("UCN") 1130 and data highway 1135, respectively. Additional process controllers can be operatively connected to plant control network 1110, if so desired. Process controllers 1120, 1125 interface analog input and output signals and digital input and output signals ("A/I," "A/O," "D/I" and "D/O", respectively) to process control system 1100 from a variety of field devices (not shown) including valves, pressure switches, pressure gauges, thermocouples or the like.

Conventional process control systems are known. Since the present invention is not limited to application in process control system 1100, FIG. 11 is illustrative only. Process control systems are disclosed in U.S. Pat. No. 4,607,256 issued to Henzel, on Aug. 19, 1986, entitled "Plant Management System;" U.S. Pat. No. 5,333,298 issued to Bland, et al., on Jul. 26, 1994, entitled "System for Making Data Available to an Outside Software Package by Utilizing a Data File which Contains Source and Destination Information;" U.S. patent application Ser. No. 08/721,254, now pending, filed on Sep. 26, 1996, entitled "System for Translating Visual Display Object files and Methods of Operation Thereof;" U.S. patent application Ser. No. 08/727,724, now pending, filed on Oct. 7, 1996, entitled "Improved UOS Module for a Distributed Process Control System;" U.S. patent application Ser. No. 08/727,725, now pending, filed on Oct. 7, 1996, entitled "Control Circuit;" and U.S. patent application Ser. No. 08/727,727, now pending, filed on Oct. 7, 1996, entitled "Emulator for Visual Display Object Files and Method of Operation Thereof," each reference is commonly assigned with the present invention and incorporated herein by reference for all purposes.

Plant control network 1110 provides overall supervision of a controlled process in conjunction with a plant operator (not shown), and obtains all the information needed to perform the supervisory function, and includes an interface with the operator. The plant control network 1110 includes a plurality of physical modules including a universal operator station module ("US") 1150, an application module ("AM") 1160, a history module ("HM") 1170, a computer module ("CM") 1180 and possibly duplicates of these modules (or additional types of modules, not shown) as necessary to perform the required control/supervisory function of the process being controlled. Each of these physical modules is operatively connected to a local control network ("LCN") 1190 that permits each of these modules to communicate with one another as necessary. NIM 1140 and HG 1145 provide an interface between the LCN 1190 and the UCN 1130 and data highway 1135, respectively.

According to an advantageous embodiment, a computer processing environment (e.g., computer 100, networks 200 to 210, processing 20 circuitry 300, etc.) according to the present invention may be associated with process control system 1100, and, more particularly, with any portion of plant control network 1110. The computer processing environment at a minimum is associated with a volatile memory and a processor that are under the control of an operating system. The operating system capable of operating on parameterized collection classes, at least one of said parameterized collection classes defining a structure of an object repository containing data relating to the plant controlled by real time process control system 1100.

The computer processing environment associated with a persistent data store, that is also associated with the memory, in which the structure of the object repository is memory-mapped, and a processor. The processor operates to instantiate an occurrence of the object repository in the memory, the object repository thereby becoming persistent. The processor also provides direct access by at least one routine executing in the processor to the persistent object repository, which is capable of surviving termination of the routine as a result of the memory mapping.

Real time process control system 1100 has a variety of sensors and controllable field devices, such as valves, pressure switches, pressure gauges, thermocouples or the like, as examples. The sensors produce data for the computer system to receive. The controllable devices receive commands from the computer system to control the operation of the plant, most advantageously issued as a function of the data received from the sensors. The present embodiment may be used to allow the object repository to function as an intermediary between the routines that control the plant and a data bus (e.g., NIM 1140, HG 1145, UCN 1130, data highway 1135, etc.) that transfers data to and from the computer system and the sensors and controllable devices. The result is again a survivable, robust, persistent parameterized object repository whose existence is independent of the control routines with which it may interact.

From the above, it is apparent that the present invention provides a computer system, a method of creating and allowing access to a parameterized collection class and a real time process control system. The computer system includes: (1) a memory containing an operating system capable of operating on one or more parameterized collection classes, or objects, (2) a persistent data store, associated with the memory, in which a parameterized collection class is memory-mapped and (3) a processor, associated with the memory and the persistent data store, that: (a) instantiates an occurrence of the parameterized collection class in the memory, the parameterized collection class thereby becoming persistent, and (b) provides direct access by at least one routine executing in the processor to the persistent parameterized collection class, the persistent parameterized collection class surviving termination of the routine.

Although the present invention and its advantages have been described in detail, those skilled in the art should understand that they can make various changes, substitutions and alterations herein without departing from the spirit and scope of the invention in its broadest form.

What is claimed is:

1. A computer system, comprising:
   a memory containing an operating system capable of operating on one or more parameterized collection classes;
   a persistent data store, coupled to said memory, in which a parameterized collection class is memory-mapped; and
   a processor, associated with said memory and said persistent data store, that instantiates an occurrence of said parameterized collection class in said memory, said parameterized collection class thereby becoming persistent, and provides direct access by at least one routine executing in said processor to said persistent parameterized collection class, said persistent parameterized collection class surviving termination of said at least one routine.

2. The system as recited in claim 1 wherein said operating system supports execution of separate execution threads in said processor, said processor instantiating an occurrence of said persistent parameterized collection class in each of said separate execution threads, thereby providing direct access by routines executing within each of said separate execution threads to said persistent parameterized collection class.

3. The system as recited in claim 1 wherein said persistent data store is a nonvolatile storage unit of a computer system.

4. The system as recited in claim 1 wherein said persistent parameterized collection class is an object repository.

5. The system as recited in claim 1 wherein said at least one routine queries said persistent parameterized collection class to extract data therefrom.

6. The system as recited in claim 1 wherein said parameterized collection class includes access semantics selected from the group consisting of:
   associative array access semantics, and
   iterator access semantics.

7. The system as recited in claim 1 wherein said persistent parameterized collection class is divided into a plurality of pages and transferred from said persistent data store as a function of a demand for said plurality of pages.

8. The system as recited in claim 1 wherein said persistent parameterized collection class and said at least one routine are executed in a single processor.

9. The system as recited in claim 1 wherein said system is associated with a real time process control system, said persistent parameterized collection class being an object repository containing data relating to a controlled plant.

10. A method of operating a computer system to create and allow access to a parameterized collection class, comprising the steps of:
    defining a structure of said parameterized collection class;
    memory mapping said structure in a persistent data store;
    instantiating an occurrence of said parameterized collection class in a memory, said parameterized collection class thereby becoming persistent; and
    providing direct access by at least one routine to said persistent parameterized collection class, said persistent parameterized collection class surviving termination of said at least one routine.

11. The method as recited in claim 10 further comprising the steps of:
    providing separate execution threads; and
    instantiating an occurrence of said persistent parameterized collection class in each of said separate execution threads, thereby providing direct access by routines executing within each of said separate execution threads to said persistent parameterized collection class.

12. The method as recited in claim 10 wherein said persistent data store is a nonvolatile storage unit of a computer system.

13. The method as recited in claim 10 wherein said persistent parameterized collection class is an object repository.

14. The method as recited in claim 10 wherein said at least one routine queries said persistent parameterized collection class to extract data therefrom.

15. The method as recited in claim 10 wherein said parameterized collection class includes access semantics selected from the group consisting of:
    associative array access semantics, and
    iterator access semantics.

16. The method as recited in claim 10 further comprising the steps of:
    dividing said persistent parameterized collection class into a plurality of pages; and transferring said pages from said persistent data store as a function of a demand for said plurality of pages.

17. The method as recited in claim 10 wherein said persistent parameterized collection class and said at least one routine are executed in a single computer system.

18. The method as recited in claim 10 wherein said method is performed in a real time process control system, said persistent parameterized collection class being an object repository containing data relating to a controlled plant.

19. A real time process control system, comprising:
a computer system having a memory and under control of an operating system capable of operating on parameterized collection classes, at least one of said parameterized collection classes defining a structure of an object repository containing data relating to a plant to be controlled by said real time process control system;
a plurality of sensors and controllable devices; and
a data bus associating said computer system to said plurality of sensors and controllable devices, said computer system including:
a persistent data store, coupled to said memory, in which said structure is memory-mapped, and
a processor, coupled to said memory and said persistent data store, that instantiates an occurrence of said object repository in said memory, said associative object repository thereby becoming persistent, and provides direct access by at least one routine executing in said processor to said persistent object repository, said persistent object repository surviving termination of said at least one routine.

20. The system as recited in claim 19 wherein said operating system supports execution of separate execution threads in said processor, said processor instantiating an occurrence of said persistent object repository in each of said separate execution threads, thereby providing direct access by routines executing within each of said separate execution threads to said persistent object repository.

21. The system as recited in claim 19 wherein said persistent data store is a nonvolatile storage unit of said computer system.

22. The system as recited in claim 19 wherein, during execution, said at least one routine detects whether said persistent object repository exists, and instantiates a new object repository only if said persistent associative object repository does not exist.

23. The system as recited in claim 19 wherein said at least one routine queries said persistent object repository to extract data therefrom.

24. The system as recited in claim 19 wherein said parameterized collection class includes access semantics selected from the group consisting of:
associative array access semantics, and
iterator access semantics.

25. The system as recited in claim 19 wherein said persistent object repository is divided into a plurality of pages and transferred from said persistent data store as a function of a demand for said plurality of pages.

26. The system as recited in claim 19 wherein said persistent object repository and said at least one routine are executed in a single processor.

27. The system as recited in claim 19 wherein said parameterized collection class defines a plurality of object repositories.

28. The system as recited in claim 19 wherein said persistent object repository survives termination of said operating system.

29. A method of operating a real time process control system, comprising the steps of:
executing an operating system within a computer system of said real time plant control system, said computer system having a memory, said operating system capable of operating on parameterized collection classes, at least one of said parameterized collection classes defining a structure of an object repository containing data relating to a plant to be controlled by said real time process control system;
defining a structure of said object repository;
memory mapping said structure in a persistent data store;
instantiating an occurrence of said object repository in said memory, said object repository thereby becoming persistent;
communicating data among said persistent object repository and a plurality of sensors and controllable devices of said plant to be controlled; and
providing direct access by at least one routine to said persistent object repository, said persistent object repository surviving termination of said at least one routine.

30. The method as recited in claim 29 further comprising the steps of:
providing separate execution threads; and
instantiating an occurrence of said persistent object repository in each of said separate execution threads, thereby providing direct access by routines executing within each of said separate execution threads to said persistent object repository.

31. The method as recited in claim 29 wherein said persistent data store is a nonvolatile storage unit of said computer system.

32. The method as recited in claim 29 further comprising the steps of:
detecting, during execution of said at least one routine, whether said persistent object repository exists; and
instantiating an object repository only if said persistent object repository does not exist.

33. The method as recited in claim 29 wherein said at least one routine queries said persistent object repository to extract data therefrom.

34. The method as recited in claim 29 wherein said parameterized collection class includes access semantics selected from the group consisting of:
associative array access semantics, and
iterator access semantics.

35. The method as recited in claim 29 further comprising the steps of:
dividing said persistent object repository into a plurality of pages; and
transferring said pages from said persistent data store as a function of a demand for said plurality of pages.

36. The method as recited in claim 29 wherein said persistent object repository and said at least one routine are executed in a single computer system.

37. The method as recited in claim 29 wherein said parameterized collection class defines a plurality of object repositories.

38. The method as recited in claim 29 wherein said persistent object repository survives termination of said operating system.

* * * * *